United States Patent
Hogdal et al.

(10) Patent No.: US 6,658,600 B1
(45) Date of Patent: Dec. 2, 2003

(54) TARGET CONTROL ABSTRACTION FOR DEBUGGING EMBEDDED SYSTEMS

(75) Inventors: Greg Hogdal, Redmond, WA (US); Yadhu N. Gopalan, Redmond, WA (US); David M. Sauntry, Redmond, WA (US); James A. Stulz, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/557,268

(22) Filed: Apr. 24, 2000

(51) Int. Cl.[7] .................................................. G06F 11/00
(52) U.S. Cl. .......................................... 714/33; 714/37
(58) Field of Search ....................... 714/33, 37; 703/21; 716/4; 717/135

(56) References Cited

U.S. PATENT DOCUMENTS

| | | | | |
|---|---|---|---|---|
| 5,404,496 A | * | 4/1995 | Burroughs et al. | 714/28 |
| 5,428,618 A | * | 6/1995 | Ueki et al. | 717/124 |
| 5,581,695 A | * | 12/1996 | Knoke et al. | 714/28 |
| 6,094,729 A | * | 7/2000 | Mann | 714/25 |
| 6,188,975 B1 | * | 2/2001 | Gay | 703/22 |
| 6,223,144 B1 | * | 4/2001 | Barnett et al. | 703/22 |
| 6,240,529 B1 | * | 5/2001 | Kato | 714/33 |
| 6,249,881 B1 | * | 6/2001 | Porten et al. | 714/38 |
| 6,298,320 B1 | * | 10/2001 | Buckmaster et al. | 703/28 |
| 6,389,558 B1 | * | 5/2002 | Herrmann et al. | 714/39 |

OTHER PUBLICATIONS

Atomica Website: http://www.atomica.com, search input: kernel.*

Universal Debugger Interface (UDI) specification, version 1.4, revision 3, Aug. 17, 1995, Advanced Micro Devices, Inc.

* cited by examiner

Primary Examiner—Scott Baderman
Assistant Examiner—Christopher S McCarthy
(74) Attorney, Agent, or Firm—Lee & Hayes, PLLC

(57) ABSTRACT

Target control abstraction for debugging embedded systems is disclosed. In an abstracted hardware model, there is a non-hardware-specific debugging interface, for communication between a debugger for the embedded system and the hardware of the embedded system. In an abstracted hardware-via-software model, there is a proxy to receive commands intended for the hardware of the embedded system from the debugger, and a component within a kernel of the embedded system to receive the commands and convey them to the hardware.

25 Claims, 6 Drawing Sheets

TARGET CONTROL ABSTRACTION FOR DEBUGGING EMBEDDED SYSTEMS

FIELD OF THE INVENTION

This invention relates generally to embedded systems, and more particularly to debugging embedded systems. However, the invention can be applied to other computer systems as well.

BACKGROUND OF THE INVENTION

Embedded systems are the most prevalent of all computer systems used today, accounting for the vast majority of microprocessors sold. Advances in processor technology and memory technology and their associated low cost allow them to be considered for a large number of applications. The size and sophistication of embedded applications has correspondingly grown.

Embedded systems share most of the following characteristics. They generally are developed around custom hardware, require high quality and reliability, and frequently deal with real-time issues. The applications running on these systems can be very large and complex. Examples of such systems include telecommunication switching systems, aircraft, spacecraft, and weapons systems, and a multitude of applications in the car and in the house. Other examples of embedded systems include cellular phones, set-top boxes, and personal-digital assistant (PDA) devices.

Because of their required reliable and often real-time nature, embedded systems generally require careful debugging to ensure that they work as intended. However, debugging embedded systems can be difficult. The advantages of embedded systems—the variety in processors often found in them, their reliability, etc.—make for their debugging to be arduous. Within the prior art, development environments—which are the sets of software tools used by developers to develop embedded system applications—usually cater to only a small number of different processors. This means that a developer who is adept at using a given development environment may find him or herself having to use a different environment for projects that use chips not supported by the favored environment.

Furthermore, the development environments within the prior art are typically hard coded for a particular set of processors. This means that the extensibility of such environments is limited. It is difficult, for example, to extend the environments to support other processors, without having to re-code them. Moreover, it is difficult to extend the features supported by the environments. A given development environment, for example, may support certain debugging features which a developer may desire to use with another development environment. Within the prior art, however, this is difficult to accomplish.

Furthermore, existing universal debugging interfaces are limited. For example, the Universal Debugger Interface (DBI) known within the art is relative to a specific process, and thus is not general for over all processes. It does not include memory search and copy primitives as well, limiting its usefulness. For these and other reasons, therefore, there is a need for the present invention.

SUMMARY OF THE INVENTION

The invention relates to target control abstraction for debugging embedded systems, where the term "target" non-restrictively and in a non-limiting manner refers to hardware, such as a processor, that is part of an embedded system, and which is desired to be debugged. In one embodiment, there are two abstracted models for debugging an embedded system: an abstracted hardware model, and an abstracted hardware-via-software model. The hardware model includes a non-hardware-specific debugging interface, for communication between a debugger for the embedded system and the hardware of the embedded system. The hardware-via-software model includes a proxy to receive commands intended for the hardware of the embedded system from the debugger, and a component within a kernel of the embedded system to receive the commands and convey them to the hardware. However, in other embodiments of the invention, the component is not within the kernel, for example, and can be any type of software agent on the target.

Embodiments of the invention provide for advantages not found within the prior art. For example, the non-hardware-specific debugging interface allows for easy extensibility of the development environment. New processors can often be easily supported without re-coding of the entire development environment; rather, only a translation driver is typically necessary to parse the debugging interface to a particular new target (although in other embodiments, more components can be needed or changed than the driver). New functionality can also be easily integrated into the development environment without re-coding, via plug-ins that utilize the non-hardware-specific interface. Similarly, by using proxies and kernel components particular to a given target, the hardware-via-software model allows for easy extensibility since only a new proxy and kernel component usually need to be developed to support a new target.

Furthermore, as compared to the UDI universal debugger interface known within the art, embodiments of the invention are not relative to a specific process, and thus are generalized over all processes, making for a better debugger. In one embodiment, memory search and copy primitives are provided, providing a further advantage as compared to the UDI.

The invention includes computer-implemented methods, machine-readable media, computerized systems, and computers of varying scopes. Other aspects, embodiments and advantages of the invention, beyond those described here, will become apparent by reading the detailed description and with reference to the drawings.

DETAILED DESCRIPTION OF THE INVENTION

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated.

It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as processing or computing or calculating or determining or displaying or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Operating Environment

Figure 1:
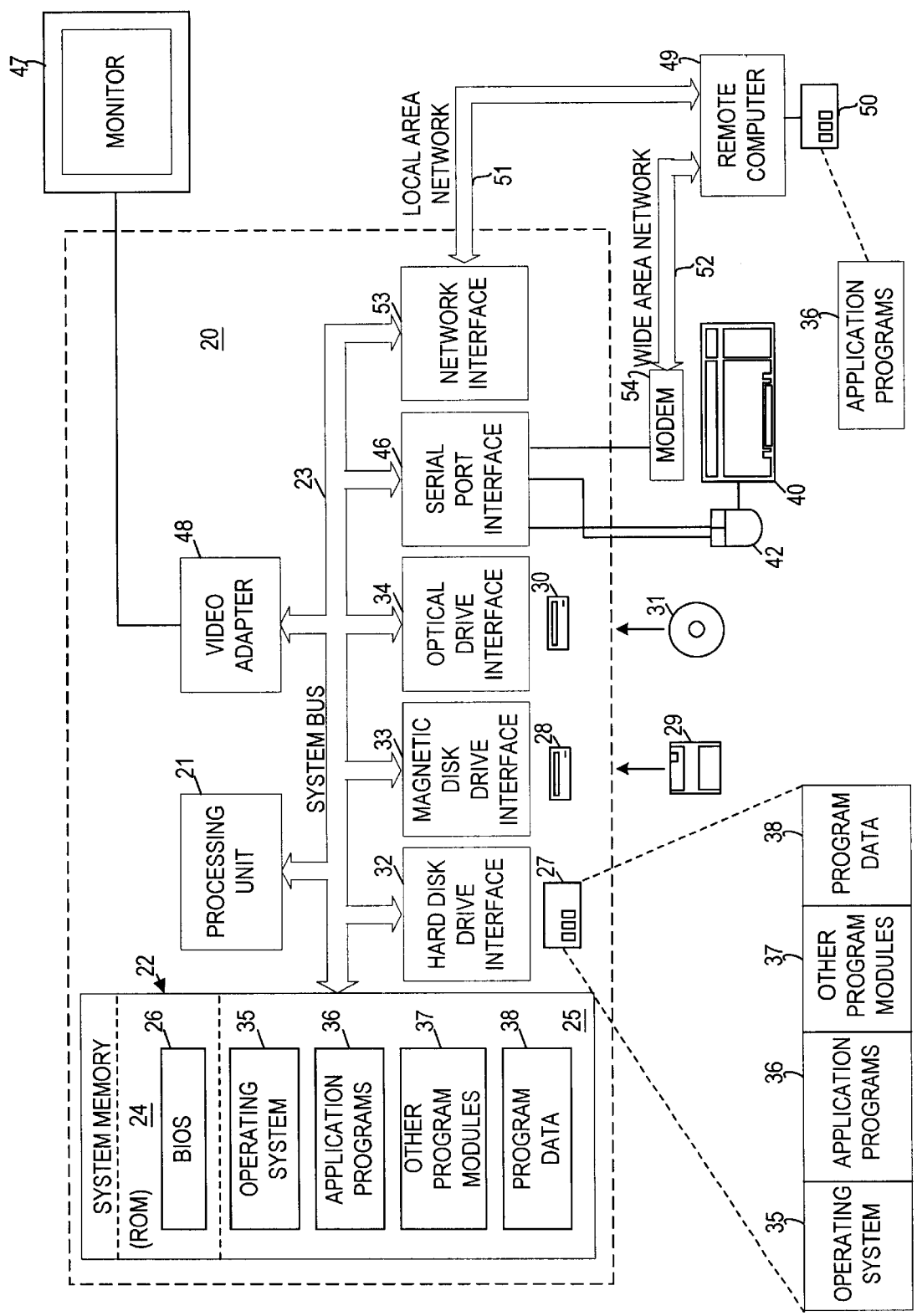
FIG. 1 is a diagram of an operating environment in conjunction with which embodiments of the invention can be practiced.

Referring to FIG. 1, a diagram of the hardware and operating environment in conjunction with which embodiments of the invention may be practiced is shown. The description of FIG. 1 is intended to provide a brief, general description of suitable computer hardware and a suitable computing environment in conjunction with which the invention may be implemented. Although not required, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PC's, minicomputers, mainframe computers, and the like. The invention may also be practiced in distributed computing environments where tasks are performed by remote processing devices that are linked through a communications network. In a distributed computing environment, program modules may be located in both local and remote memory storage devices.

The exemplary hardware and operating environment of FIG. 1 for implementing the invention includes a general purpose computing device in the form of a computer 20, including a processing unit 21, a system memory 22, and a system bus 23 that operatively couples various system components include the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 1. The logical connections depicted in FIG. 1 include a local-area network (LAN) 51 and a wide-area network (WAN) 52. Such networking environments are commonplace in office networks, enterprise-wide computer networks, intranets and the Internet, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a type of communications device, or any other type of communications device for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

Overview

Figure 2:
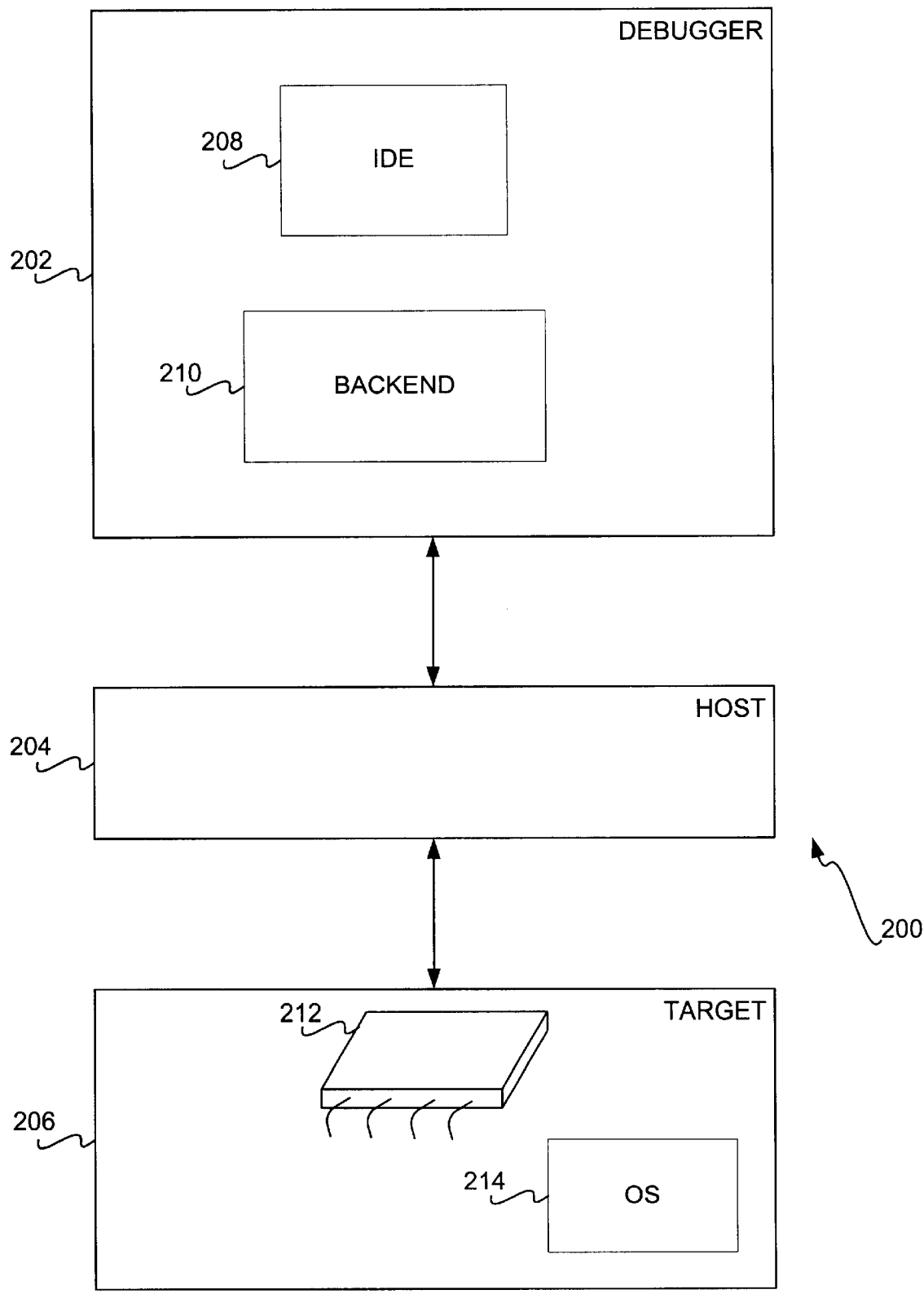
FIG. 2 is a diagram of an embedded system debugging environment in conjunction with which embodiments of the invention can be implemented.

In this section of the detailed description, an overview of an embedded system debugging environment, in conjunction with which embodiments of the invention can be implemented, is described, with reference to FIG. 2, which is a diagram of an embedded system debugging environment 200 according to an embodiment of the invention. The environment 200 includes a debugger 202, an optional host 204, and an embedded system target 206. The debugger 202 is utilized to debug the embedded system target 206, which may be temporarily coupled to the host 204 for this and other purposes.

The debugger 202 can be implemented on a desktop computer, such as the computer described in conjunction with FIG. 1 in the previous section of the detailed description. The debugger 202 desirably includes an integrated development environment 208, and a debugger backend 210. The integrated development environment (IDE) 208 provides for the functionality, features, and user interface by which a developer is able to debug the target 206. Such integrated development environments are known within the art, and the environment 208 is only specifically described in-depth as to the integration of embodiments of the invention with such an environment. The backend 210 is the component of the debugger 202 that can in one embodiment be hidden to the user, and is what actually asserts debugging and other commands to the target 206, via, for example, the host 204, and is similarly described in-depth as to the integration of embodiments of the invention. Each of the IDE 208 and the backend 210 can in one embodiment be computer programs running on a processor of a computer from a computer-readable medium, such as a memory, thereof.

The host 204 is optional, and is used in certain situations to provide for the debugging of the embedded system target 206, as can be appreciated by those of ordinary skill within the art. For example, the host 204 can be or include an emulator. Where the host 204 includes an emulator, generally the host can communicate with the target via the Joint Test Action Group (JTAG) standard known within the art, and/or the Background Debug Mode (BDM) standard also known within the art—although the invention itself is not so limited. The host 204, however, is not required by all embodiments of the invention. In one embodiment, the host 204 is also a computer, such as has been described in conjunction with FIG. 1 in the previous section of the detailed description.

The embedded system target 206 is the target of the debugging performed by the debugger 202. The target 206 typically includes hardware 212, such as a processor that can function as a central processing unit (CPU), as well as an operating system 214, although the latter is not necessary in all embodiments of the invention. Typically, a probe or host or emulator plugs into the hardware 212 via a standard (e.g., JTAG, BDM, etc.) or proprietary interface, and the probe, host or emulator plugs into the debugger via a different interface, such as serial, Ethernet, IEEE-1394, etc., so that the hardware 212 can be specifically controlled, and examined for debugging analysis. In one embodiment, the operating system (OS) 214 also provides this control and examination functionality. Furthermore, in one embodiment, the OS 214 includes a kernel, which is the fundamental part of the OS that typically resides in memory at all times and provides the basic services. It is the part of the operating system 214 that is closest to the machine and may activate the hardware directly or interface to another software layer that drives the hardware.

The debugging that can be performed within the environment 200 by embodiments of the invention is not limited by the invention. Typical debugging includes, however, diagnosing crashes; detecting memory usage and corruption problems; detecting memory leaks; detecting stack overflow situations; detecting errant pointers; and, fine-tuning performance. Such debugging can be accomplished, for example, via functionality such as, but not limited to, full-target processor halts; debugging without kernel dependency; setting breakpoints in memory such as read-only memory (ROM), flash memory, and read-access memory (RAM); setting true watchpoints; allowing hooks for real-time tracing of program execution, tracing data reads and writes of specific widths and/or values, and link tracing to events; monitoring the target on the fly, without breaking into the kernel or halting the processor; and, performing memory and/or input/output (I/O) substitutions, in real-time and/or at lower speeds.

Abstracted Hardware Model

In this section of the detailed description, an abstracted hardware model for embedded systems debugging, according to an embodiment of the invention, is described. It is noted that the model described in this section can be utilized by itself, or in conjunction with other debugging models, such as the abstracted hardware-via-software model described in the next section of the detailed description. However, the invention itself is not so limited.

Figure 3:
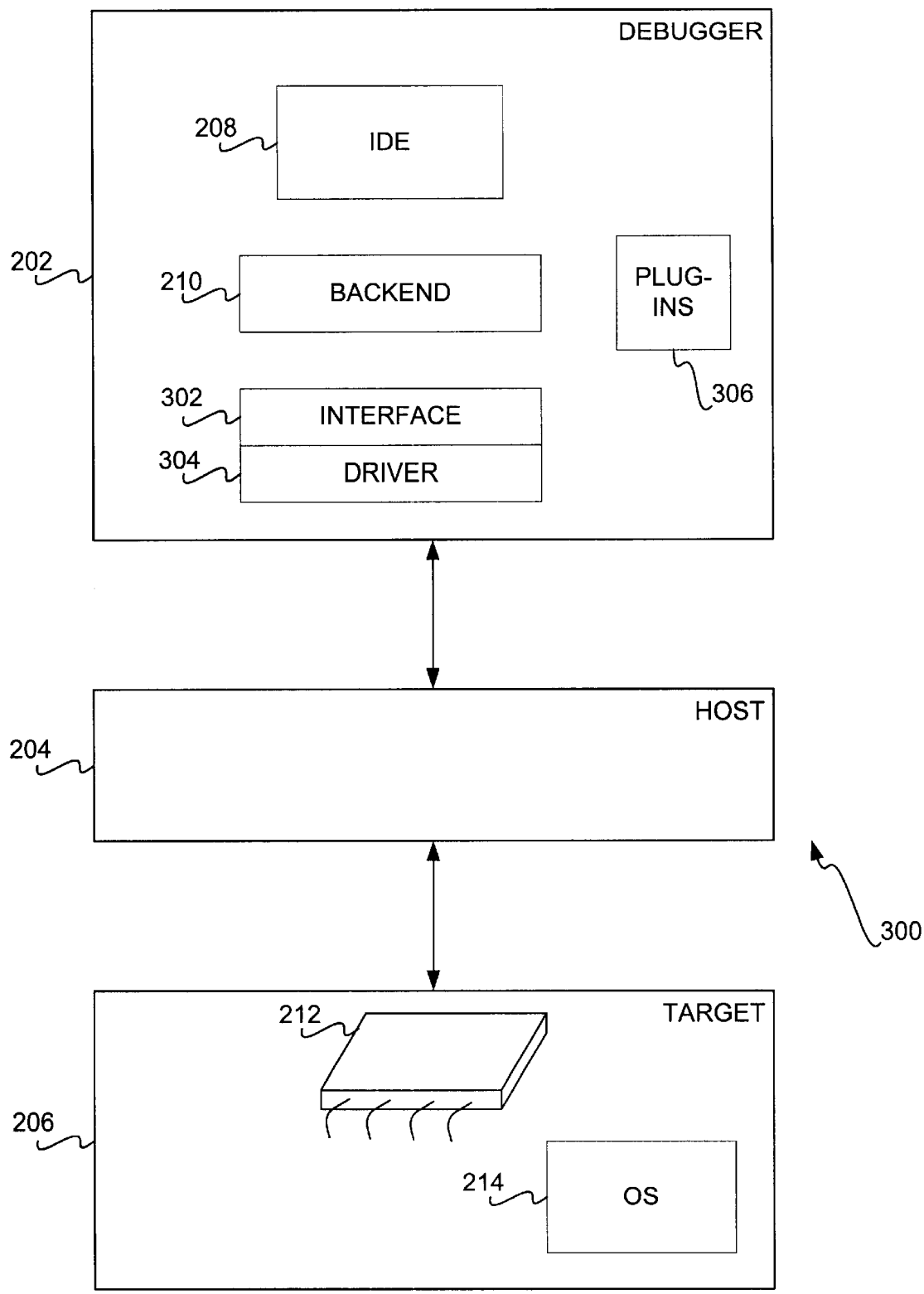
FIG. 3 is a diagram of a system in which an abstracted hardware debugging model according to one embodiment of the invention is implemented.

Referring to FIG. 3, a diagram of a system 300 in which an abstracted hardware debugging model according to an embodiment of the invention is implemented is shown. The system 300 includes a debugger 202, a host 204, and a target 206, where these system components have been described already in the previous section of the detailed description. Specifically, the debugger 202 includes an IDE 208 and a backend 210, while the target includes hardware 212 and optionally an OS 214. The abstracted hardware model specifically focuses on the addition of an interface 302 and a driver 304 to the debugger 202, as well as optional plug-ins 306.

The interface 302 is a non-hardware-specific debugging interface, for communication between the debugger 202 and the target 206. The interface 302 specifically receives generic debugging commands from the IDE 208, the backend 210, and the optional plug-ins 306, and communicates these commands to the driver 304. The driver 304 is particular to the target 306, and translates the commands to a form that the target 306 understands.

In one embodiment, the interface 302 implements one or more of the following run control and/or memory access primitives: Run, to start execution of the target 306; Halt, to stop execution; DoSingleStep, to perform a single step within the target 306; DoMultipleStep, to perform a number of steps; DoRangeStep, perform a single step within a predetermined address range; Breakpoint to Add, to add breakpoints to either the code of the target 306 and/or the data within the target 306 (and similar primitives to delete such breakpoints); NotifyRunStateChange, to receive exceptions from the target 306; and, MemoryAccess, to read and write from and to memory, such as virtual, physical, input/output (I/O), and register memory. The invention is not limited to these primitives, however.

Embodiments of the invention provide for easier integration of a given debugger 202 with new targets. Specifically, the IDE 208 and the backend 210 often do not have to be modified to add support for a new target, in distinction with the prior art, which usually requires re-coding for new target support. Rather, only a new driver 304 has to be developed, to translate the commands from the interface 302 to the new target. Thus, the non-hardware-specific nature of the interface 302 is such that it allows for the IDE 208 and the backend 210 to communicate therewith in a standard manner, such that the drivers are responsible for translating the standard commands to hardware-specific commands. The interface 302 is in one embodiment an application programming interface (API), while the driver 304 is in one embodiment a computer program executed by a processor from a memory.

Furthermore, the non-hardware-specific nature of the interface 302 allows for added functionality to be added to the debugger 302, via one or more plug-ins 306. Because the plug-ins 306 only have to be developed for standard communication with the interface 302, and not particular to any target 206, developers can easily add features to the debugger 202 without having to hard code support for a given target. The plug-ins 306 can add any type of functionality of the debugger 302, and communicate with the target 206 via the interface 302, comparable to the IDE 208 and the backend 210 of the debugger 202.

The manner by which the abstracted hardware debugging model operates in one embodiment of the invention is described with reference to FIG. 4, which is a flowchart of a method 400 according to an embodiment of the invention. The method can in some embodiments be computer-implemented. A computer-implemented method is desirably realized at least in part as one or more programs running on a computer—that is, as a program executed from a computer-readable medium such as a memory by a processor of computer. The programs are desirably storable on a machine-readable medium such as floppy disk or a CD-ROM, for distribution and installation and execution on another computer. The program or programs can be a part of a computer system or a computer, such as that described in conjunction with FIG. 1 in a previous section of the detailed description. The invention is not so limited, however.

Figure 4:
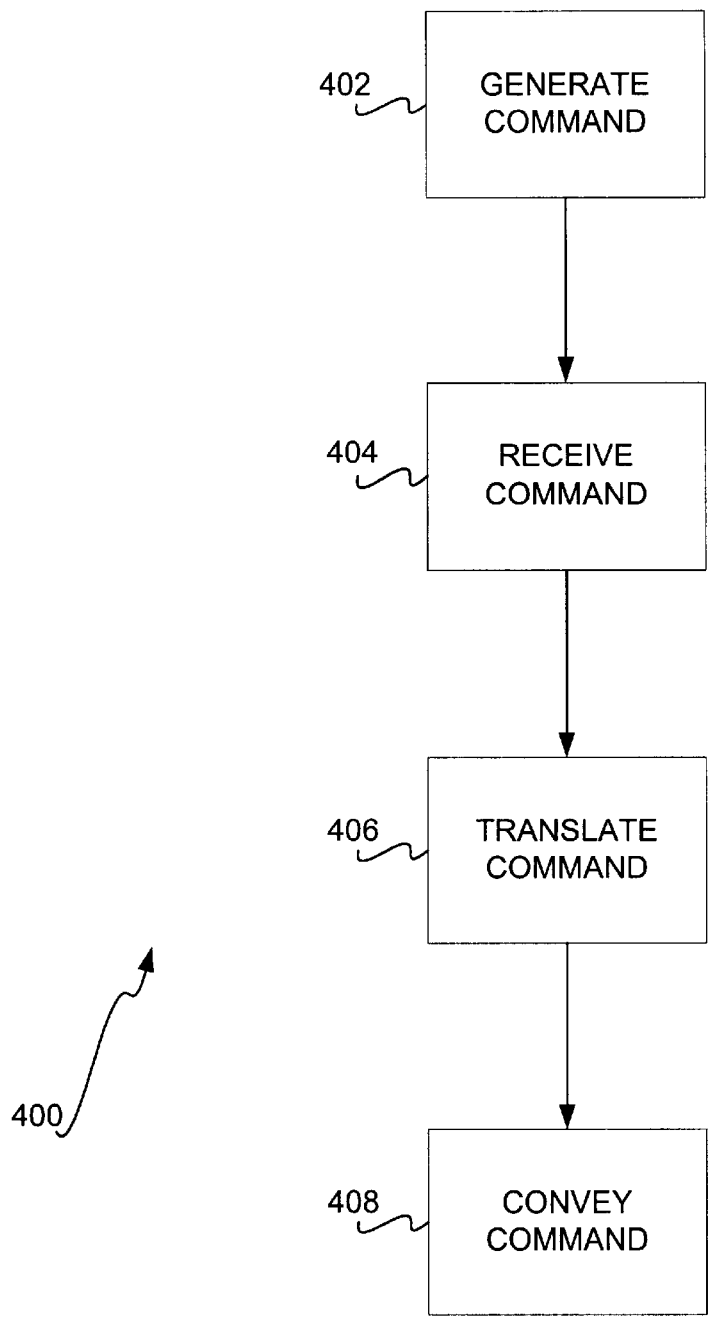
FIG. 4 is a flowchart of an abstracted hardware debugging method according to an embodiment of the invention.

Referring now to FIG. 4, in 402, a non-hardware-specific command is generated within a debugger, such as by the IDE, the backend, or a plug-in of the debugger. This command is received in 404 by the non-hardware-specific interface, such that the driver particular to the target embedded system being debugged translates the non-hardware-specific command to a hardware-specific or target-specific command in 406. This target-specific command is then conveyed to the target embedded system, such as to the hardware thereof. In one embodiment, conveyance is via an emulator or a host for the embedded system, although the invention is not so limited. It is noted that communication is bi-directional as to between the debugger and the target embedded system in one embodiment, which is not specifically shown in FIG. 4.

In another embodiment, the non-hardware-specific command is generated within the debugger, and is received by the interface. If the driver particular to the target embedded system being debugged supports this command, then it sends it to the target as indicated in the previous paragraph. However, if it does not support this command, then a standard software debugger instead takes over, as is currently done within the prior art, as can be appreciated by those of ordinary skill within the art. Thus, a different manner is utilized to translate the command to a hardware-specific command and convey the command to the hardware.

It is noted that embodiments of the invention can be implemented that vary from that which is described here. For example, in one embodiment, the driver receives commands from the backend and the plug-ins directly. As another example, the IDE must go through the backend to communicate with the driver.

It is also noted that the abstracted debugging model described in this section of the detailed description is an abstracted hardware debugging model because it does not utilize the operating system of the target (i.e., the software of the target), but rather directly accesses the hardware, such as the processor, of the target embedded system. This is in distinction with an abstracted hardware-via-software model, as described in the next section of the detailed description, which utilizes the operating system of the target to access the hardware of the target embedded system.

Abstracted Hardware-via-Software Model

In this section of the detailed description, an abstracted hardware-via-software model for embedded systems debugging, according to an embodiment of the invention, is described. It is noted that the model described in this section can be utilized by itself, or in conjunction with other debugging models, such as the abstracted hardware model described in the previous section of the detailed description. However, the invention itself is not so limited.

Figure 5:
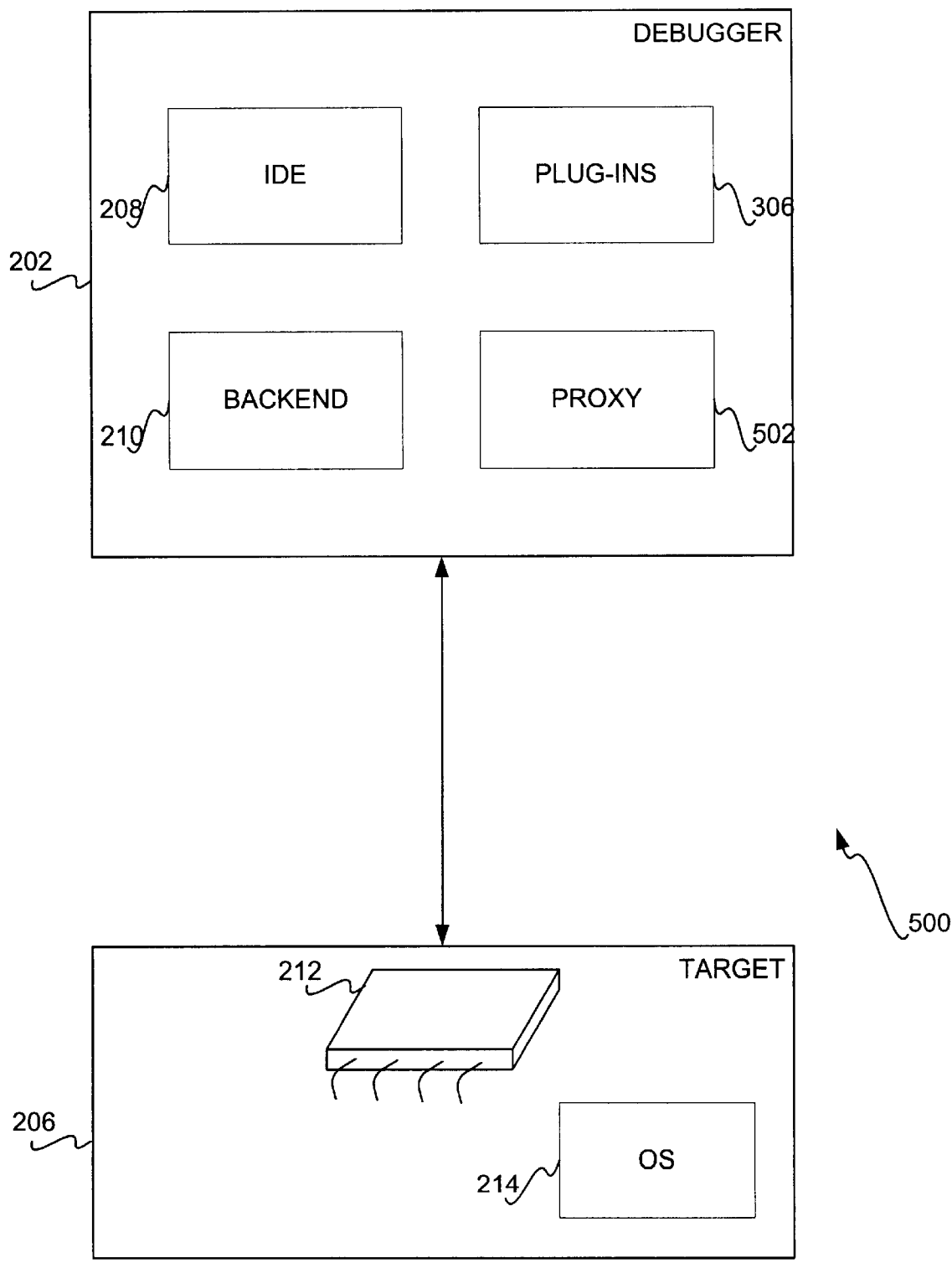
FIG. 5 is a diagram of a system in which an abstracted hardware-via-software debugging model according to an embodiment of the invention is implemented; and, FIG. 6 is a flowchart of an abstracted hardware-via-software debugging method according to an embodiment of the invention.

Referring to FIG. 5, a diagram of a system 500 in which an abstracted hardware-via-software debugging model according to an embodiment of the invention is implemented is shown. The system 500 includes a debugger 202, and a target 206, where these system components have been described already in the previous sections of the detailed description. Specifically, the debugger includes plug-ins 306, an IDE 208 and a backend 210, while the target includes hardware 212 and an OS 214. It is noted that a host is not shown in the system 500 of FIG. 5 because it is usually not required for implementation of the hardware-via-software debugging model. The abstracted hardware-via-software model specifically focuses on the addition of a proxy 502, as well as a component within the OS 214 (not particularly shown in FIG. 5). In one embodiment, where the OS 214 is a version of the Microsoft Windows CE operating system, the component is the KDHAL component known within the art.

The proxy 502 is operating system specific, or includes an OS-specific component, and receives commands intended for the hardware of the embedded system target 206. It receives these commands from the IDE 208, the backend 210, and the optional plug-ins 306, and communicates these commands to a component within the operating system 214, such as a component within the kernel of the OS 214, where the component itself conveys them to the hardware 212 of the embedded system. It is noted that in one embodiment, the proxy 502 communicates with the OS 214 via a standard communication link, such as a serial cable or an Ethernet connection. The component within the OS 214 is specific to the hardware of the embedded system, and in one embodiment is situated within another component within the kernel that is non-hardware specific. In one embodiment, the proxy 502 implements one or more of the same control and/or access primitives as the interface 302 of FIG. 3 does, as described in the previous section of the detailed description.

The manner by which the abstracted hardware-via-software debugging model operates in one embodiment of the invention is described with reference to FIG. 6, which is a flowchart of a method 600 according to an embodiment of the invention. The method can in some embodiments be computer-implemented. A computer-implemented method is desirably realized at least in part as one or more programs running on a computer—that is, as a program executed from a computer-readable medium such as a memory by a processor of a computer. The programs are desirably storable on a machine-readable medium such as a floppy disk or a CD-ROM, for distribution and installation and execution on another computer. The program or programs can be a part of a computer system or a computer, such as that described in conjunction with FIG. 1 in a previous section of the detailed description. The invention is not so limited, however.

Figure 6:
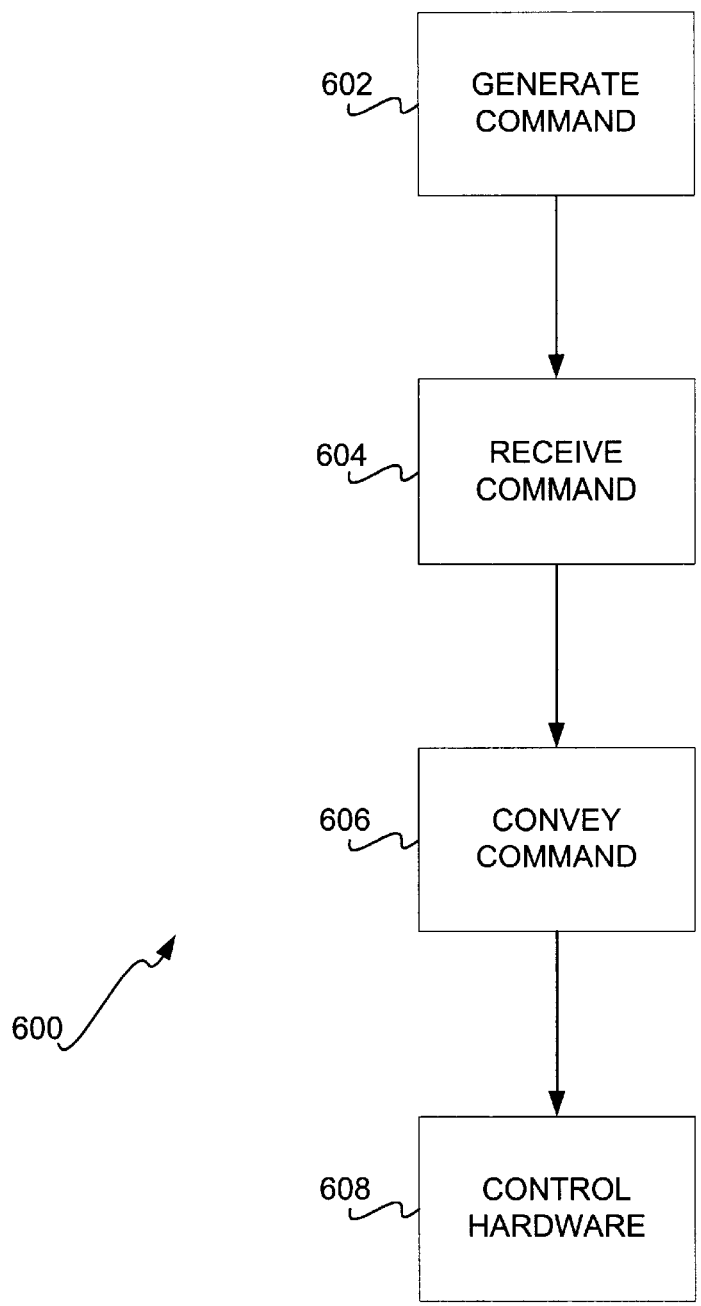

Referring now to FIG. 6, in 602, a command is generated within a debugger, such as by the IDE, the backend, or a plug-in of the debugger. This command is received in 604 by a hardware-specific proxy, which conveys the command to a component within a kernel of an operating system of the embedded system in 606, such as via a standard communication link. Thus, in 608, the hardware of the embedded system, such as a processor, is controlled by the command.

It is noted that the abstracted debugging model described in this section of the detailed description is an abstracted hardware-via-software model because it utilizes the operating system of the target (i.e., the software of the target). This is in distinction with an abstracted hardware model, as described in the previous section of the detailed description. An advantage to using the hardware-via-software model, as opposed to an abstracted hardware model is that the developer does not need specific hardware to experience an enhanced debugging environment. For example, data breakpoints implemented all in software may take substantially longer to complete compared to a hardware-via-software model. Another advantage is that a probe or emulator is not required.

Conclusion

It is noted that, although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention. Therefore, it is manifestly intended that this invention be limited only by the claims and equivalents thereof.

We claim:

1. A computerized system for debugging an embedded system comprising at least one of:
   an abstracted hardware model including a non-hardware-specific bebugging interface for communicating between a debugger for the embedded system and hardware of the embedded system; and,
   an abstracted hardware-via-software model such that commands are received intended for the hardware of the embedded system of the bebugger, the model including a component within the embedded system to receive the commands and convey them to the hardware of the embedded system,
   wherein the non-hardware-specific debugging interface provides for communication between one or more plug-ins of the debugger and the hardware of the embedded system.

2. A computerized system for debugging an embedded system comprising at least one of:
   an abstracted hardware model including a non-hardware-specific hardware debugging interface for communicating between a debugger for the embedded system and hardware of the embedded system; and,
   an abstracted hardware-via-software model such that commands are received intended for the hardware of the embedded system from the debugger, the model including a component within the embedded system to receive the commands and convey them to the hardware of the embedded system,
   wherein the non-hardware-specific debugging interface implements a plurality of debugging primitives.

3. The system of claim 2, wherein the abstracted hardware-via-software model further includes a proxy to receive the commands intended for the hardware.

4. The system of claim 2, wherein the abstracted hardware model includes a driver specific to the hardware of the embedded system to receive commands from the non-hardware-specific debugging interface and translate them to corresponding commands particular to the hardware of the embedded system.

5. The system of claim 2, wherein the abstracted hardware model includes an emulator for hardware of the embedded system situated between the non-hardware-specific debugging interface and the hardware of the embedded system.

6. The system of claim 2, wherein the non-hardware-specific debugging interface provides for communication between a backend of the debugger and the hardware of the embedded system.

7. The system of claim 2, wherein the plurality of debugging primitives comprises one or more run control primitives and one or more memory access primitives.

8. The system of claim 2, wherein a standard communication link communicatively connects a proxy and the component within the embedded system.

9. A computerized system for debugging an embedded system comprising at least one of:

an abstract hardware model including a non-hardware-specific debugging interface for communicating between a debugger for the embedded system and hardware of the embedded system; and, an abstracted hardware-via-software model such that commands are received intended for the hardware of the embedded system from the debugger, the model including a component within the embedded system to receive the commands and convey them to the hardware of the embedded system, wherein a proxy and the component within the kernel are specific to the hardware of the embedded system.

10. A computerized system for debugging an embedded system comprising at least one of:

an abstracted hardware model including a non-hardware-specific debugging interface for communication between a debugger for the embedded system and hardware for the embedded system; and, an abstracted hardware-via-software model such that commands are received intended for the hardware of the embedded system from the debugger, the model including a component within the embedded system to receive the commands and convey them to the hardware of the embedded system, wherein the component is specific to the hardware of the specific system, and is situated within another component that is non-hardware-specific.

11. A computerized system comprising:

a target of an embedded system; and, a debugger for the embedded system comprising:

a non-hardware-specific debugging interface for communication between a debugger for the embedded system and the target of the embedded system, a debugger backend and at least one plug-in, each of which communicate with the target via the non-hardware-specific debugging interface.

12. The system of claim 11, wherein the target of the embedded system comprises hardware of the embedded system.

13. The system of claim 11, the debugger further comprising a driver specific to the target of the embedded system to receive commands from the non-hardware-specific debugging interface and translate them to corresponding commands particular to the hardware of the embedded system.

14. A computerized system comprising:

a target of an embedded system; and, a debugger for the embedded system comprising a non-hardware-specific debugging interface for communication between the debugger for the embedded system and the target of the embedded system, wherein the non-hardware-specific debugging interface implements a plurality of debugging primitives.

15. A computerized system comprising:

a target of an embedded system;

a kernel of the embedded system providing for manipulation of the target; and, a debugger for the embedded system comprising a proxy to receive commands intended for the hardware of the embedded system and convey the commands to a component of the kernel for controlling the target, a debugger backend and at least one plug-in, each of each which communicate with the target via the commands received by the proxy and conveyed to the component.

16. A computerized system comprising:

a target of an embedded system;

a kernel of the embedded system providing for manipulation of the target; and, a debugger for the embedded system comprising a proxy to receive commands intended for the hardware of the embedded system and to convey the commands to a component of the kernel for controlling the target, wherein the proxy and the component are specific to the target of the embedded system.

17. A computerized system comprising:

a target of an embedded system, a kernel of the embedded system providing for manipulation of the target; and, a debugger for the embedded system comprising a proxy to receive commands intended for the hardware of the embedded system and to convey the commands to a component of the kernel for controlling the target, wherein the component is specific to the target, and is situated within another component within the kernel that is non-hardware specific.

18. The system of claim 17, wherein the target of the embedded system comprises hardware of the embedded system.

19. The system of claim 17, wherein the kernel is part of an operating system of the embedded system.

20. The system of claim 17, wherein a standard communication link communicatively connects the proxy and the component.

21. A computer-implemented method for debugging an embedded system comprising:

generating a non-hardware-specific command by one of a backend and a plug-in of a debugger;

receiving the non-hardware-specific command by a non-hardware-specific debugging interface from the debugger;

translating the non-hardware-specific command to a hardware-specific command by a hardware-specific driver;

conveying the hardware-specific command to hardware of the embedded system.

22. The method of claim 21, wherein conveying the hardware-specific command to the hardware of the embedded system is via an emulator for the embedded system.

23. A computer-implemented method for debugging an embedded system comprising:

receiving a non-hardware-specific command by a non-hardware specific debugging interface from a debugger;

determining by a hardware-specific driver whether the driver supports the command;

upon determining that the driver supports the command, translating the non-hardware-specific command to a hardware-specific command by the hardware-specific driver;

conveying the hardware-specific command to hardware of the embedded system;

otherwise, translating the non-hardware-specific command to the hardware-specific command and conveying the hardware-specific command to the hardware in a different manner.

24. A computer-implemented method for debugging an embedded system comprising:

generating a command by one of a backend and a plug-in of a debugger;

receiving the command by a hardware-specific proxy from the debugger;

conveying the command to a component within the embedded system; and, controlling hardware of the embedded system via the command.

25. The method of claim 24, wherein conveying the command to the component comprises conveying the command via a standard communication link.

* * * * *

UNITED STATES PATENT AND TRADEMARK OFFICE
CERTIFICATE OF CORRECTION

PATENT NO. : 6,658,600 B1
DATED : December 2, 2003
INVENTOR(S) : Hogdal et al.

It is certified that error appears in the above-identified patent and that said Letters Patent is hereby corrected as shown below:

Column 8,
Line 1, insert -- a -- between "of" and "computer".

Column 10,
Line 15, replace "bebugging" with -- debugging --.
Line 20, replace "of" with -- from -- between "system" and "the".
Line 20, replace "bebugger" with -- debugger --.
Line 31, delete "hardware" between "specific" and "debugging"
Line 31, replace "communicating" with -- communication --.

Column 11,
Line 1, replace "abstract" with -- abstracted --.
Line 2, replace "communicating" with -- communication --.
Line 19, replace "for" with -- of --.
Line 27, replace "specific" with -- embedded --.
Line 34, replace "a" with -- the -- between "between" and "debugger"
Line 65, insert -- to -- between "and" and "convey"

Signed and Sealed this

Twenty-second Day of June, 2004

JON W. DUDAS
*Acting Director of the United States Patent and Trademark Office*